US009311275B2

United States Patent
Jang et al.

(10) Patent No.: US 9,311,275 B2
(45) Date of Patent: Apr. 12, 2016

(54) METHOD AND APPARATUS FOR DISCRETE COSINE TRANSFORM/INVERSE DISCRETE COSINE TRANSFORM

(75) Inventors: Euee S Jang, Seoul (KR); Kiho Choi, Seoul (KR); Sunyoung Lee, Seoul (KR); Sikyoung Kim, Seoul (KR)

(73) Assignee: IUCF-HYU (INDUSTRY-UNIVERSITY COOPERATION FOUNDATION, HANYANG UNIVERSITY), Seoul (KR)

(*) Notice: Subject to any disclaimer, the term of this patent is extended or adjusted under 35 U.S.C. 154(b) by 1034 days.

(21) Appl. No.: 13/496,711

(22) PCT Filed: Jul. 9, 2010

(86) PCT No.: PCT/KR2010/004462
§ 371 (c)(1),
(2), (4) Date: Mar. 16, 2012

(87) PCT Pub. No.: WO2012/005395
PCT Pub. Date: Jan. 12, 2012

(65) Prior Publication Data
US 2012/0179734 A1 Jul. 12, 2012

(51) Int. Cl.
*G06F 17/14* (2006.01)
*H04N 19/625* (2014.01)

(52) U.S. Cl.
CPC ............ *G06F 17/147* (2013.01); *H04N 19/625* (2014.11)

(58) Field of Classification Search
None
See application file for complete search history.

(56) References Cited

U.S. PATENT DOCUMENTS

| 5,224,062 | A  | * | 6/1993  | McMillan et al. ............ | 708/402 |
| 5,576,958 | A  | * | 11/1996 | Kawakatsu et al. ........... | 708/402 |
| 6,421,695 | B1 | * | 7/2002  | Bae et al. ....................... | 708/402 |
| 2007/0073795 | A1 | * | 3/2007 | Miller et al. ................... | 708/400 |
| 2008/0050036 | A1 | * | 2/2008 | Bulusu et al. .................. | 382/281 |
| 2011/0289128 | A1 | * | 11/2011 | Star Sung ...................... | 708/210 |

OTHER PUBLICATIONS

J. S. Chiang, Y. F. Chiu and T. H. Chang, "A high throughput 2-dimensional DCT/IDCT architecture for real-time image and video system", Proc. 8th IEEE Int. Conf. Electron., Circuits Syst., vol. 2, pp. 867-870, 2001.*
E. Murata, M. Ikekawa, and I. Kuroda, "Fast 2D IDCT Implementation with multimedia instructions for a software MPEG-2 decoder", Proc. IEEE Int. Conf. Acoustics, Speech, and Signal Processing, pp. V 3105-V 3108, 1998.*

* cited by examiner

*Primary Examiner* — Andrew Caldwell
*Assistant Examiner* — Matthew Sandifer
(74) *Attorney, Agent, or Firm* — Birch, Stewart, Kolasch & Birch, LLP

(57) ABSTRACT

Discrete cosine transform/inverse discrete cosine transform method and device are provided. The discrete cosine transform/inverse discrete cosine transform method includes: generating a table index for only an input value other than 0 (zero) out of input values of coordinates in an input block; reading one or more partial values corresponding to the table index out of a plurality of table information pieces which are generated and stored in advance so as to include partial values corresponding to a multiplication of a weight value and an index; and adding the read partial value and calculating the resultant value of each coordinate in an output block. Accordingly, it is possible to perform a fast DCT/IDCT operation and to reduce the energy consumption for the transform.

12 Claims, 6 Drawing Sheets

METHOD AND APPARATUS FOR DISCRETE COSINE TRANSFORM/INVERSE DISCRETE COSINE TRANSFORM

TECHNICAL FIELD

The present invention relates to discrete cosine transform (DCT)/inverse discrete cosine transform (IDCT) method and device.

BACKGROUND ART

Under present communication environments, various communication networks such as a broadband convergence network (BcN) enabling services such as cooperation of wired and wireless communications and convergence of broadcast networks and communication networks are combined and this trend will be accelerated.

General-purpose media communications have been much studied with the trend of digital convergence in various communication networks, and size transformation techniques for video have been variously studied with an increase in diversity of multimedia terminals.

Among the size transformation techniques of video, a method employing discrete cosine transform (DCT) exhibits excellent performance. The DCT is also used in video codecs such as MPEG-1, MPEG-2, MPEG-4, and H.263, which have excellent compatibility.

The DCT is a transformation technique of an input analog original video into frequency components of a low frequency and a high frequency through the use of the mathematically defined process of DCT.

The DCT/IDCT techniques according to the background art will be described below in brief The mathematical definition of N×N 2D-DCT/IDCT according to the background art will be first described. Expression 1 represents the mathematical definition of IDCT and Expression 2 represents the mathematical definition of DCT.

$$f(x, y) = \frac{2}{N} \sum_{u=0}^{N-1} \sum_{v=0}^{N-1} C(u)C(v)F(u, v) \cos\frac{(2x+1)u\pi}{2N} \cos\frac{(2y+1)v\pi}{2N} \quad \text{Expression 1}$$

$$F(u, v) = \frac{2}{N} C(u)C(v) \sum_{x=0}^{N-1} \sum_{y=0}^{N-1} f(x, y) \cos\frac{(2x+1)u\pi}{2N} \cos\frac{(2y+1)v\pi}{2N} \quad \text{Expression 2}$$

$$C(u), C(v) = \begin{cases} \frac{1}{\sqrt{2}}, & \text{for } u, v = 0 \\ 1, & \text{otherwise} \end{cases}$$

In the expressions, x and y represent an x coordinate and an y coordinate in a pixel domain and f(x, y) represent a pixel value corresponding to a coordinate (x, y), in the expressions, u and v represent a u coordinate and a v coordinate in a frequency domain and F(u, v) represent a coefficient value corresponding to a coordinate (u, v) in a DCT domain. N represents the size. For example, when N is 8, the IDCT/DCI' is performed on total 64 pixels of 8×8. C(u) and C(v) represent scaling factors, respectively.

When N=8 (that is, 8×8 block) is assumed which is the value most used in image or video compression standards for performing the IDCT using Expression 1, the necessary operation includes 4096 multiplications and 4032 additions.

However, since this is an excessive operation load for use in an actual system, the IDCT/DCT using row-column decomposition is more used than the approach based on the mathematical definitions of Expressions 1 and 2 in practice. According to the row-column decomposition, the primary DCT/IDCT is performed by the number of columns in the row direction and the primary IDCT/DCT is performed by the number of rows in the column direction. Therefore, in the case of 8×8 block, the primary DCT/IDCT is performed 8 times in the row direction and the primary DCT/IDCT is performed 8 times in the column direction, that is, the primary DCT/IDCT is performed 16 times in total.

FIG. 1 is a diagram illustrating Chen's algorithm generally used in the row-column decomposition.

In order to perform a 2D-DCT/IDCT in the Chen's algorithm, the primary DCT/IDCT is performed by the number of columns in the row direction and then the primary DCT/IDCT is performed in the number of rows in the column direction. The values obtained through the primary DCT/IDCT in the row and column directions are the resultant values of the two-dimensional DCT/IDCT.

In the Chen's algorithm, the 2D-DCT/IDCT operation necessary for N=8 (that is, 8×8 block) includes 256 multiplications and 416 additions, which is much smaller than that in the approach based on the above-mentioned mathematical definitions.

However, the operation load is smaller than that of the existing DCT/IDCT, and there is still a problem in that input values on which it is not necessary to perform the DCT/IDCT are still included in the operation.

As described above, the DCT/IDCT techniques according to the background art have a problem in that a large operation load is required for the transformation process. Accordingly, phenomena of time delay and heat emission are caused in the transformation device and large energy consumption is also caused.

The row-column decomposition of which the operation load is considered to be much reduced has a problem in that an input value "0 (zero)" of which the operation is not necessary for using a butterfly structure is included in the DCT/IDCT operation. Accordingly, there is a problem in that the operation complexity unnecessarily increases.

The above-mentioned related art is technical information possessed to make the invention or learned in the course of making the invention by the inventor, and cannot thus be said to be technical information known to the public before filing the invention.

DETAILED DESCRIPTION OF THE INVENTION

Technical Problem

An advantage of the invention is to provide discrete cosine transform/inverse discrete cosine transform method and device which can be generally applied to various data compression/decompression techniques employing DCT/IDCT. For example, the invention can be generally applied to image coding techniques such as PEG, video compression/decompression techniques such as MGEP series and H.26X series, and audio compression/decompression techniques such as MPEG techniques and Dolby techniques, and the like.

Another advantage of the invention is to provide discrete cosine transform/inverse discrete cosine transform method and device which can reduce an operation load and operation complexity to allow a fast transformation and which can reduce energy consumption to promote portability of mobile devices requiring multimedia compression and decompression.

Still another advantage of the invention is to provide discrete cosine transform/inverse discrete cosine transform method and device which can allow a fast transformation by excluding an input value "0 (zero)" which is not necessarily included in operation from the operation.

Still another advantage of the invention is to provide discrete cosine transform/inverse discrete cosine transform method and device which cannot cause a degradation in image quality due to mismatch in various fast DCT/IDCT algorithms by storing accurate calculated values in advance.

Other advantages of the invention will be easily understood from the following description.

Technical Solution

According to an aspect of the invention, there are provided a discrete cosine transform (DCT)/inverse discrete cosine transform (IDCT) method and a recording medium having recorded thereon a program for executing the DCT/IDCT method.

According to an embodiment of the invention, there is provided a discrete cosine transform (DCT)/inverse discrete cosine transform (IDCT) method includes: generating a table index for only an input value other than 0 (zero) out of input values of coordinates in an input block; reading one or more partial values corresponding to the table index out of a plurality of table information pieces which are generated and stored in advance so as to include partial values corresponding to a multiplication of a weight value and an index; and adding the read partial value and calculating the resultant value of each coordinate in an output block.

The reading of the partial values may include: determining whether the partial value corresponding to the table index is stored in the table information pieces; calculating the partial values through the multiplication corresponding to the table index and updating the table information pieces when it is determined that the partial value is not stored in the table information pieces; and reading the partial value corresponding to the table index from the updated table information pieces.

The weight value may be a value determined on the basis of the coordinate value in the output block and the coordinate value in the input block, and the index may be designated as a one or more integer values included in the range of the input values.

The weight value for the IDCT may be calculated by the following expression:

$$A(x, y, u, v) = \frac{2}{N} C(u)C(v) \cos\frac{(2x+1)u\pi}{2N} \cos\frac{(2y+1)v\pi}{2N}$$

where N represents the size of width and length of the input block, x and y constitute a coordinate value (x, y) in a pixel domain, u and v constitutes a coordinate value (u, v) in a frequency domain, and C(u) and C(v) represent scaling factors, respectively.

According to another embodiment of the invention, there is provided a discrete cosine transform (DCT)/inverse discrete cosine transform (IDCT) method causing an operation device to perform one or more of a DCT operation and an IDCT operation, including: recognizing the number of input values other than 0 out of input values of coordinates in an input block and comparing the recognized number of input values with a predetermined reference value; and performing a table-based transform method out of a row-column decomposition-based method and the table-based transform method only when the number of input values other than 0 is equal to or less than the reference value. Here, the table-based transform method includes: generating a table index for only an input value other than 0 (zero) out of the input values of the coordinates in the input block; reading one or more partial values corresponding to the table index out of a plurality of table information pieces which are generated and stored in advance so as to include partial values corresponding to a multiplication of a weight value and an index; and adding the read partial value and calculating the resultant value of each coordinate in an output block.

The reading of the partial values may include: determining whether the partial value corresponding to the table index is stored in the table information pieces; calculating the partial values through the multiplication corresponding to the table index and updating the table information pieces when it is determined that the partial value is not stored in the table information pieces; and reading the partial value corresponding to the table index from the updated table information pieces.

The number of input values other than 0 may be recognized with reference to the number of level values in the course of entropy coding.

The number of input values other than 0 for an MPEG-4 part10 AVC/H.264 codec may be recognized using information on the number of input values other than 0 which is calculated and stored as a parameter in advance.

The weight value may be a value determined on the basis of the coordinate value in the output block and the coordinate value in the input block, and the index may be designated as a one or more integer values included in the range of the input values.

The weight value for the IDCT may be calculated by the following expression:

$$A(x, y, u, v) = \frac{2}{N} C(u)C(v) \cos\frac{(2x+1)u\pi}{2N} \cos\frac{(2y+1)v\pi}{2N}$$

where N represents the size of width and length of the input block, x and y constitute a coordinate value (x, y) in a pixel domain, u and v constitutes a coordinate value (u, v) in a frequency domain, and C(u) and C(v) represent scaling factors, respectively.

According to another aspect of the invention, there is provided a discrete cosine transform (DCT)/inverse discrete cosine transform (IDCT) device performing one or more of a DCT operation and an IDCT operation.

According to an embodiment of the invention, there is provided a discrete cosine transform (DCT)/inverse discrete cosine transform (IDCT) device performing one or more of a DCT operation and an IDCT operation, including: a table information storage unit that stores a plurality of table information pieces including partial values corresponding to multiplication of a weight value and an index; an index calculating unit that generates a table index of only an input value other than 0 (zero) out of input values of coordinates in an input block; and an adder unit that adds one or more partial values included in the plurality of table information pieces and corresponding to the table index and calculates resultant values of coordinates in an output block.

The DCT/IDCT device may further include a table updating unit that calculating the partial values to update one or more table information pieces. Here, the table updating unit may update the table information pieces so as to include an index corresponding to a request from the index calculating unit or the adder unit when a corresponding partial value is not stored in the table information piece designated by the generated table index.

The weight value may be a value determined on the basis of the coordinate value in the output block and the coordinate value in the input block, and the index may be designated as a one or more integer values included in the range of the input values.

The DCT/IDCT device may further include a determination unit that determines whether an input of a coordinate in the input block is 0 (zero) and outputs the coordinate value corresponding to the input value 0 (zero) to the adder unit.

The weight value for the IDCT may he calculated by the following expression:

$$A(x, y, u, v) = \frac{2}{N} C(u)C(v) \cos\frac{(2x+1)u\pi}{2N} \cos\frac{(2y+1)v\pi}{2N}$$

where N represents the size of width and length of the input block, x and y constitute a coordinate value (x, y) in a pixel domain, u and v constitutes a coordinate value (u, v) in a frequency domain, and C(u) and C(v) represent scaling factors, respectively.

The input block and the output block may have a size of N×N and N may be a natural number.

According to another embodiment of the invention, there is provided a discrete cosine transform (DCT)/inverse discrete cosine transform (IDCT) device performing one or more of a DCT operation and an IDCT operation, including: a row-column decomposition-based operation unit that performs a DCT/IDCT operation based on row-column decomposition; a table-based operation unit that performs a table-based DCT/IDCT operation; and a method selecting unit that recognizes the number of input values other than 0 out of the input values of coordinates in an input block, compares the recognized number of input values with a predetermined reference value, and instructs the row-column decomposition-based operation unit or the table-based operation unit to perform an operation. Here, the table-based operation unit includes: a table information storage unit that stores a plurality of table information pieces including partial values corresponding to multiplication of a weight value and an index; an index calculating unit that generates a table index of only an input value other than 0 (zero) out of the input values of the coordinates in the input block; and an adder unit that adds one or more partial values included in the plurality of table information pieces and corresponding to the table index and calculates resultant values of coordinates in an output block.

The table-based operation unit may further include a table updating unit that calculating the partial values to update one or more table information pieces. Here, the table updating unit may update the table information pieces so as to include an index corresponding to a request from the index calculating unit or the adder unit when a corresponding partial value is not stored in the table information piece designated by the generated table index.

The method selecting unit may instruct the table-based operation unit to perform the operation only when the number of input values other than 0 is equal to or less than the reference value.

The method selecting unit may recognize the number of input values other than 0 with reference to the number of level values in the course of entropy coding.

The method selecting method for an MPEG-4 part10 AVC/H.264 codec may recognize the number of input values other than 0 using information on the number of input values other than 0 which is calculated and stored as a parameter in advance.

The weight value may be a value determined on the basis of the coordinate value in the output block and the coordinate value in the input block, and the index may be designated as a one or more integer values included in the range of the input values.

The DCT/IDCT device may further include a determination unit that determines whether an input of a coordinate in the input block is 0 (zero) and outputs the coordinate value corresponding to the input value 0 (zero) to the adder unit.

The weight value for the IDCT may be calculated by the following expression:

$$A(x, y, u, v) = \frac{2}{N} C(u)C(v) \cos\frac{(2x+1)u\pi}{2N} \cos\frac{(2y+1)v\pi}{2N}$$

where N represents the size of width and length of the input block, x and y constitute a coordinate value (x, y) in a pixel domain, u and v constitutes a coordinate value (u, v) in a frequency domain, and C(u) and C(v) represent scaling factors, respectively.

Other aspects, features, and advantages of the invention will become apparent from the accompanying drawings, the appended claims, and the detailed description.

Advantageous Effects

The invention can be generally applied to various data compression/decompression techniques employing DCT/IDCT. For example, the invention can be generally applied to image coding techniques such as JPEG, video compression/decompression techniques such as MGEP series and H.26X series, and audio compression/decompression techniques such as MPEG techniques and Dolby techniques, and the like.

According to the invention, it is possible to reduce an operation load and operation complexity to allow a fast transformation and which can reduce energy consumption to promote portability of mobile devices requiring multimedia compression and decompression.

It is also possible to allow a fast transformation by excluding an input value "0 (zero)" which is not necessarily included in operation from the operation.

It is possible to prevent a degradation in image quality due to mismatch in various fast DCT/IDCT algorithms by storing accurate calculated values in advance.

EMBODIMENTS OF THE INVENTION

The invention can be modified in various forms and specific embodiments will be described and shown below. However, the embodiments are not intended to limit the invention, but it should be understood that the invention includes all the modifications, equivalents, and replacements belonging to the concept and the technical scope of the invention. When it is determined that specific description of known techniques associated with the description of the invention makes the concept of the invention vague, the detailed description thereof will not be made.

Terms "first" and "second" can be used to describe various elements, but the elements should not be limited to the terms. The terms are used only to distinguish an element from another.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded. The sign "/" includes "and" and "or" and should be understood to mean any one thereof in the context.

Hereinafter, embodiments of the invention will be described in detail with reference to the accompanying drawings. Inverse discrete cosine transform (IDCT) or discrete cosine transform (DCT) will be mainly described this specification, but should be understood to include DCT or IDCT.

Figure 1:
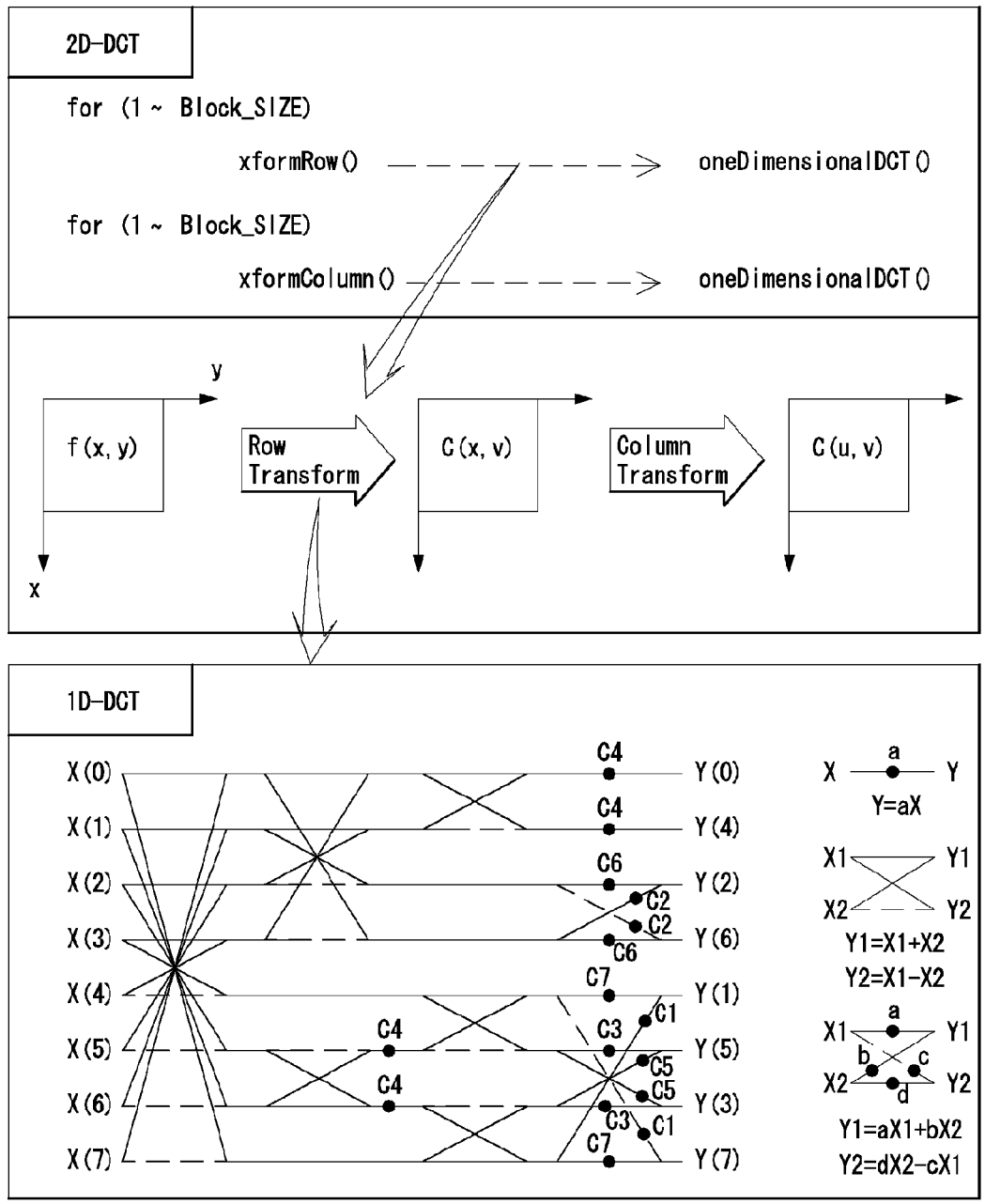
FIG. 1 is a diagram illustrating Chen's algorithm generally used in row-column decomposition.
Figure 2:
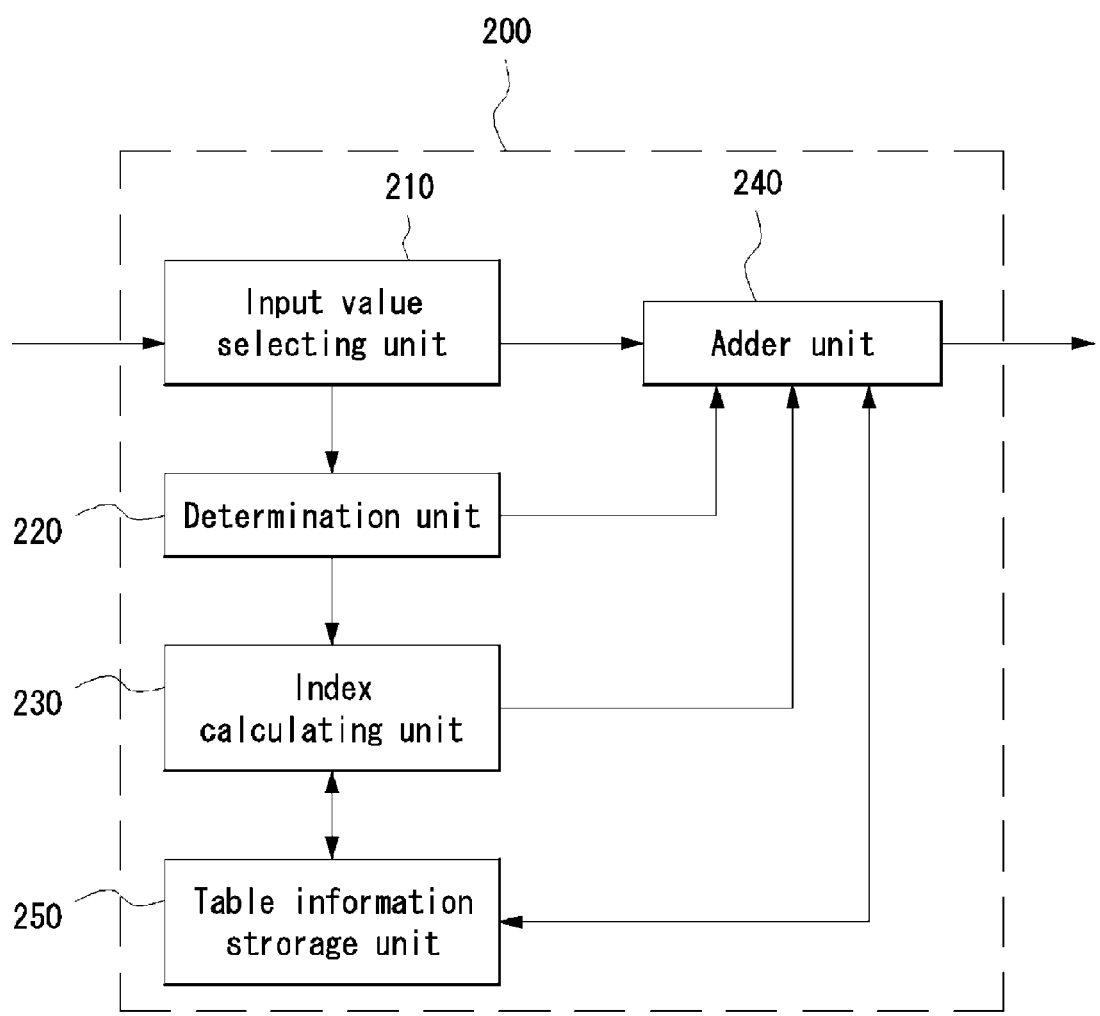
FIG. 2 is a diagram illustrating the configuration of a DCT/IDCT operation unit according to an embodiment of the invention.

FIG. 2 is a diagram illustrating the configuration of a DCT/IDCT operation unit according to an embodiment of the invention.

Referring to FIG. 2, the DCT/IDCT operation unit 200 includes an input value selecting unit 210, a determination unit 220, an index calculating unit 230, an adder unit 240, and a table information storage unit 250. The respective elements may be embodied by hardware and one or more elements may be embodied by a software algorithm.

As described below, the DCT/IDCT operation unit 200 does not perform a DCT/IDCT operation on an input value of 0 (zero) but replaces the multiplication with an access to a memory. Therefore, for the purpose of distinction from the DCT/IDCT operation unit performing an operation based on the row-column decomposition according to the background art, the DCT/IDCT operation unit may be referred to as a table-based operation unit 200 in this specification.

The input value selecting unit 210 receives an input value input to the table-based operation unit 200 and outputs the received input value to the determination unit 220. Here, the input value selecting unit 210 may determine whether to input the corresponding input value to the determination unit 220 or to the adder unit 240 with reference to the coordinate of the output value corresponding to the position in the N×N block, For example, when the coordinate of an output value in a 8×8 block is (0, 0) and the weight value (see Expression 3) is 1, it is not necessary to generate a particular table index. Accordingly, the input value selecting unit 210 may directly output the input values (that is, the input pixel values of the N×N block in the pixel domain) to the adder unit 240. When the coordinate of the output value is not (0, 0), the corresponding input values are output to the determination unit 220.

Here, the input value input to the input value selecting unit 210 varies depending on whether to perform the DCT operation or to perform the IDCT operation. For example, the input value for the DCT is a pixel value in the pixel domain and the output value is a DCT coefficient value in the frequency domain. On the contrary, the input value for the IDCT may be a DCT coefficient value in the frequency domain and the output value is a pixel value in the pixel domain.

The determination unit 220 determines whether to perform the DCT or IDCT operation with reference to the input value (for example, a pixel value) input from the input value selecting unit 210. For example, the determination unit 220 determines that the DCT/IDCT operation should not be performed on the input value of 0 (zero) and outputs the input value (that is, 0) to the adder unit 240. This is because the partial value (that is, the result value of multiplication of the weight value and the input value) is calculated to be 0 regardless of the weight value when the input value is 9 (zero), as can be seen from Expression 3.

The index calculating unit 230 calculates a table index when the determination unit 220 determines to perform the DCT/IDCT operation.

The adder unit 240 extracts or receives the partial values corresponding to the table index calculated by the index calculating unit 230 from the table information storage unit 250, adds them, and then outputs the addition result value. The adder unit 240 output the addition result values corresponding to the coordinates of the output values in the N×N block.

Figure 6:
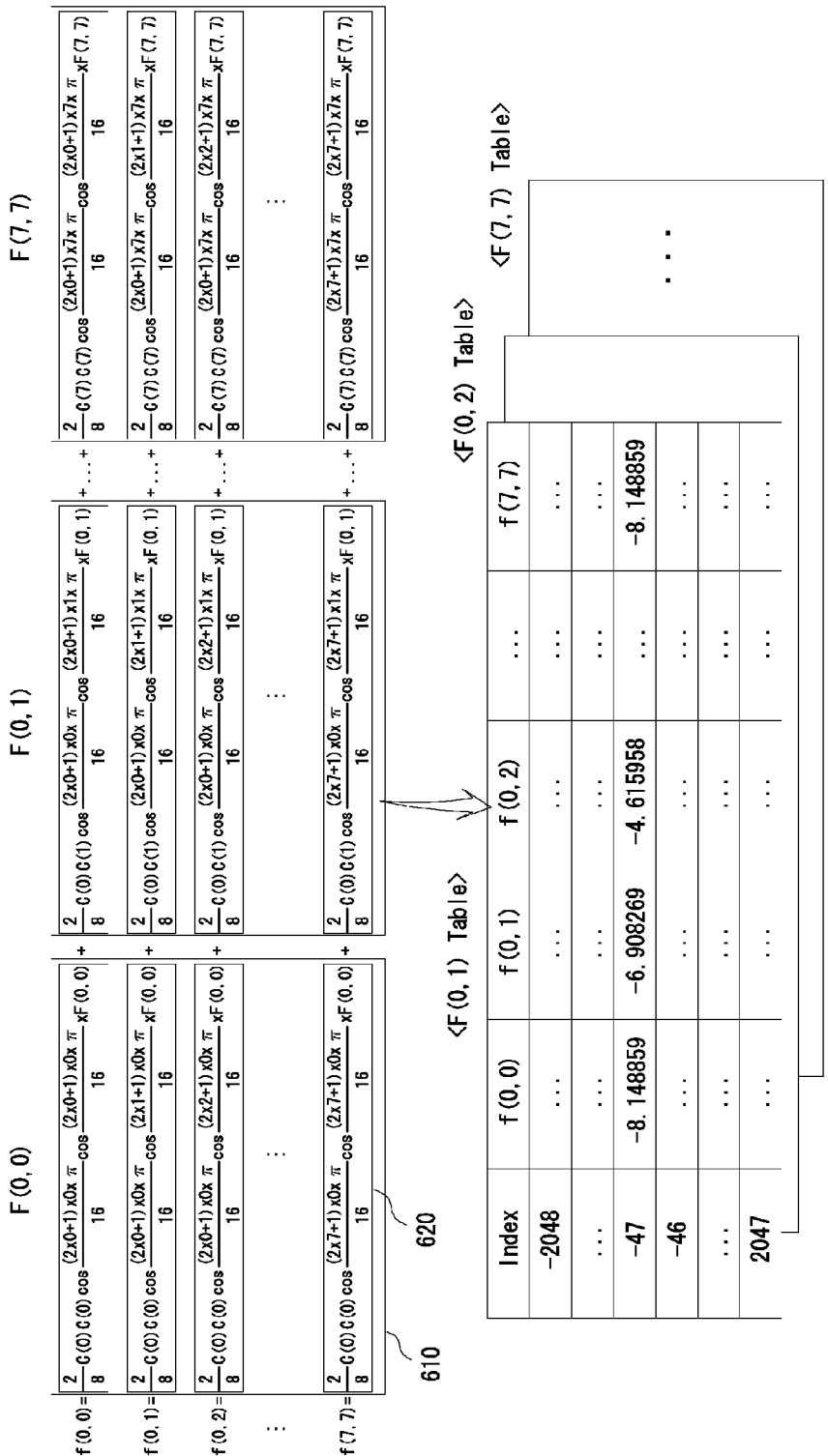
FIG. 6 is a diagram illustrating a lookup table for IDCT operation according to the embodiment of the invention.

The table information storage unit 250 stores the partial values corresponding to all the input values in the course of the DCT/IDCT operation. A table of a two-dimensional structure in which the partial values stored in the table information storage unit 250 are arranged to correspond to the coordinate values of the output block based on the input values is shown in FIG. 6. That is, a table generated in the units of 610 is shown in FIG. 6. As described above, the partial values are determined through the multiplication of the input values and the weight values determined to be constant depending on the coordinates of the output value in the N×N block.

However, the storage type of the partial values is not limited to the example shown in FIG. 6. The storage type of the partial values will be described with reference to FIG. 6. That is, the storage type of the partial values may vary depending on the design structure, such as a table of a one-dimensional design structure and a table of a three-dimensional design structure. For example, when the partial values are stored in the table of a one-dimensional design structure in the table information storage unit 250, the partial values may be stored in the units of 620 shown in FIG. 6.

When the partial values are stored in the table of a three-dimensional design structure in the table information storage unit 250, 610's shown in FIG. 6 may be incorporated into one table.

The table-based DCT/IDCT performed by the table-based operation unit 200 will be described below.

The table-based DCT/IDCT is a DCT/IDCT operation method which is approached from the DCT/IDCT mathematical definition which is not generally used, unlike the row-column decomposition method used to reduce the operation load of the DCT/IDCT operation according to the background art. In describing the table-based DCT/IDCT below, the inverse discrete cosine transform (TDCT) will be mainly described, but the same technical concept can be applied to the discrete cosine transform (DCT) similarly.

Expression 1 described above represents the mathematical definition of the IDCT. As can be seen from Expression 1, the expression includes additions and multiplications. However, the same operation is performed on 2/N, C(u), C(v), and $$\cos\frac{(2x+1)u\pi}{2N}\cos\frac{(2y+1)v\pi}{2N}$$

to calculate the pixel values (x, y) as the output values regardless of the values F(u, v) of the input coefficients, and constant values determined depending on the coordinates (x, y) of the pixel values are used. Expression 3 described below is obtained by modifying the IDCT expression in consideration of such properties of the IDCT.

$$f(x, y) = \sum_{u=0}^{N-1}\sum_{v=0}^{N-1} A(x, y, u, v)F(u, v) \qquad \text{Expression 3}$$

Here, $$A(x, y, u, v) = \frac{2}{N}C(u)C(v)\cos\frac{(2x+1)u\pi}{2N}\cos\frac{(2y+1)v\pi}{2N}$$

and $$C(u), C(v) = \begin{cases} \frac{1}{\sqrt{2}}, & \text{for } u, v = 0 \\ 1, & \text{otherwise} \end{cases}$$

are defined.

In Expression 3, the part having the same value to calculate the pixel value f(x, y) undergoing the IDCT and F(u, v) serving as an input value are separately expressed.

The function A(x, y, u, v) is a function (or a basis function for transform in geometrical meaning) having multiplications combined as defined by Expression 3 and is a function that outputs the same value regardless of the pixel value or the input coefficient value when the values of (x, y, u, v) are identical. The resultant value thereof is referred to as a weight value. The value of F(u, v) is in the range of $[-2^{n+3}, 2^{n+3}-1]$, where n represents the number of bits necessary for expressing one pixel value. For example, when it is assumed that 8 bits are used to express one pixel value, the pixel value is in the range of 0 to 255 and the DCT coefficient is in the range of −2048 to 2047 which $(-2^{11}, 2^{11}-1)$. Accordingly, the partial values stored in the table information storage unit 250 are values obtained by multiplying the indexes (that is, the values in the range of the input values) and the weight values corresponding to the coordinates of the output values and the indexes are defined as indicators in the table (for example, the table of F(0, 1) shown in FIG. 6).

Therefore, the table-based IDCT according to the embodiment of the invention serves to replace the multiplications necessary for the IDCT operation with the access to a memory by storing the partial values obtained by multiplying the weight values A(x, y, u, v) and the input values F(u, v) for all of x, y, u, and v in the form of a table or the like in the table information storage unit 250 in advance.

Expression 4 is an IDCT expression representing the table-based JT)CT using a table.

$$f(x, y) = \sum_{u=0}^{N-1}\sum_{v=0}^{N-1} \text{Table}(\text{index}(x, y, F(u, v))) \qquad \text{Expression 4}$$

Here, index( )represents a function of calculating the index corresponding to three input values of x, y, and F(u, v). That is, the table information storage unit 250 is accessed using the calculated table index. Table(a) represents a function of outputting the partial value stored to correspond to index a out of the partial values stored in the table information storage unit 250. Here, the design of the functions index( )and table( )varies depending on the materialization types thereof.

It can be seen from Expression 4 that all the multiplications are changed to the type of access to a memory, and thus the total operation load necessary for the IDCT includes $N^2$ additions.

As described above, when the input value F(u, v) or f(x, y) in case of the DCT operation is 0 in Expression 3, the calculated partial value is 0. As a result, when the input value F(u, v) is 0, the addition is not necessary. When the table index and the set (for example, the table) of the partial values stored in the table information storage unit 250 are designed on the basis thereof, it is possible to further reduce the IDCT operation load from $N^2$.

As described above, the expression for the table-based IDCT in consideration of the input value F(u, v) of 0 can be expressed by Expression 5.

$$f(x, y) = \sum_{a_i \in A_{xy}} T(a_i) \qquad \text{Expression 5}$$

Here, $A_{xy}$ is expressed by $A_{xy}=\{\text{Index}(x,y,F(u,v))|F(u,v)\neq 0, 0\leq u\leq N-1, 0\leq v\leq N-1\}$. That is, the set $A_{xy}$ represents a set of the table indexes corresponding to x, y, and F(u, v).

That is, Expression 5 represents the operation for the table index is skipped when the input value is 0 (zero) and is a table design in consideration of the number of F(u, v) values participating in the actual operation since the actual operation is not performed on N×N. The set $A_{xy}$ means a set of indexes corresponding to the F(u, v) values other than 0 out of the N×N F(u, v) values necessary for determining one pixel value (x, y) in the IDCT operation.

Accordingly, the IDCT operation is completed by causing the adder unit 240 to add all the partial values extracted using the elements of the set $A_{xy}$ as the table indexes.

As described above, the expression of the table-based DC may be expressed by Expression 6 in the form similar to Expression 5.

$$F(u, v) = \sum_{b_i \in B_{uv}} T(b_i) \qquad \text{Expression 6}$$

Here, $B_{uv}$ is expressed by $B_{uv}=\{\text{Index}(u,v,f(x,y))|f(x,y)\neq 0, 0\leq x\leq N-1, 0\leq y\leq N-1\}$. That is, the set $B_{uv}$ represents a set of the table indexes corresponding to u, v, and F(x, y).

As described above, the table-based DCT/IDCT according to the embodiment of the invention has distinct features that the multiplications are not necessary to reduce the multiplication complexity, the operation complexity is reduced by skipping the operation when the input value is 0 (zero), and accurate calculated values are stored so as not to cause the degradation in image quality, compared with the DCT/IDCT according to the background art.

Figure 3:
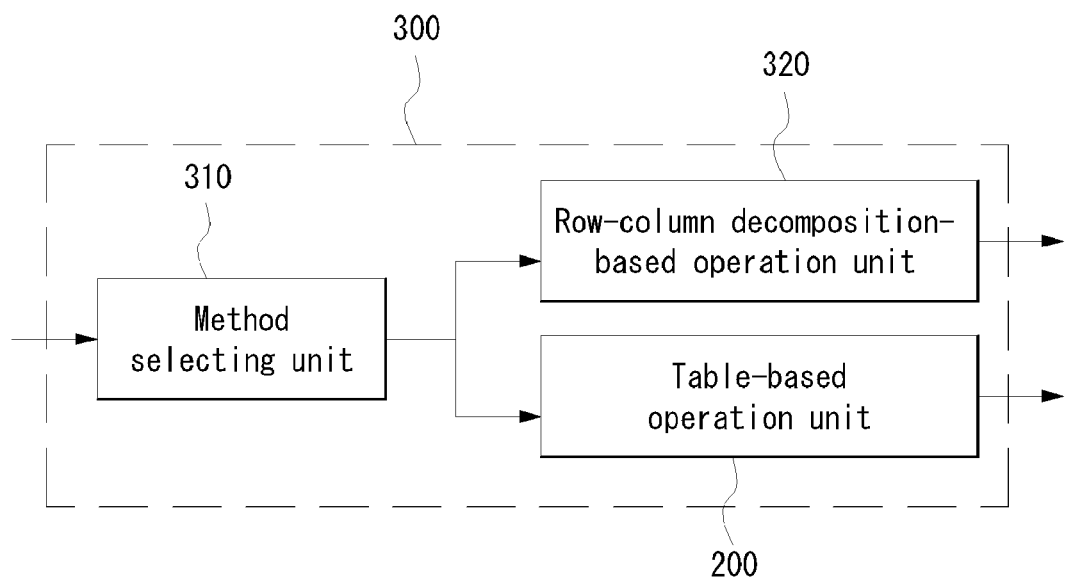
FIG. 3 is a diagram illustrating the configuration of a DCT/IDCT operation unit according to another embodiment of the invention.
Figure 4:
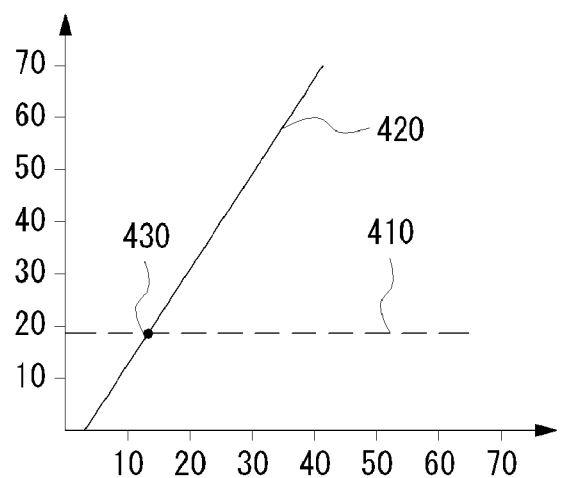
FIG. 4 is a graph illustrating comparison of operation complexity of a hybrid table-based operation method according to another embodiment of the invention and a row-column decomposition method.

The table-based DCT/IDCT may be independently performed in the process of the DCT/IDCT, and may be used in parallel with the row-column decomposition method according to the background art, as described later. In the latter, when the table-based DCT/IDCT and the row-column decomposition method are selectively performed in parallel, the DCT/IDCT operation unit 300 may be referred to as a hybrid table-based operation unit for the purpose of distinction in this specification. FIG. 3 is a diagram illustrating the configuration of a DCT/IDCT operation unit according to another embodiment of the invention. FIG. 4 is a graph illustrating the comparison of operation complexity of the hybrid table-based operation method according to another embodiment of the invention and the row-column decomposition method.

Referring to FIG. 3, the hybrid table-based operation unit 300 includes a method selecting unit 310, a row-column decomposition-based operation unit 320, and a table-based operation unit 200. The elements may be embodied by hardware, or one or more elements may be embodied in the form of a software algorithm.

The method selecting unit 310 calculates the number of input values other than 0 (zero) out of the DCT/IDCT input values for the hybrid table-based DCT/IDCT operation, causes the table-based operation unit 200 to perform the DCT/IDCT operation when the number of input values other than 0 is equal to or less than a reference value, and causes the row-column decomposition-based operation unit 320 to perform the DCT/IDCT operation when the number of input values other than 0 is more than the reference value (that is, when the number of input values which are 0 is smaller than the reference value).

The method of causing the method selecting unit 310 to calculate the number of input values other than 0 (or the number of input values which are 0) can be variously embodied. It is obvious that the method selecting unit 310 can be recognize one of the number of input values other than 0 and the number of input values which are 0 by recognizing the other. In the method of calculating the number of input values which are 0, for example, in the case of MPEG-4 part 2 SP, the entropy coding is performed before the IDCT operation. In the entropy coding process, the entropy decoding process is performed on the values other than 0. At this time, the number of input values other than 0 can be calculated by counting the number of times of performing the entropy decoding. In the case of MPEG-4 part 10 AVC/H.264 codec, since the number of input values other than 0 is calculated and stored as a specific parameter in advance, the number of input values which are 0 may be calculated using the value of the specific parameter. In addition, the specific method of calculating the number of input values which are 0 can be variously embodied depending on the conditions such as by codec or by design standard.

Here, as shown in FIG. 4, the reference value 430 can be defined as an intersection between the operation complexity graph 410 based on the row-column decomposition method and the operation complexity graph 420 based on the table-based DCT/IDCT operation depending on the number of input values other than 0. In FIG. 4, the horizontal axis (x axis) represents the number of input values other than 0 out of the input values and the vertical axis (y axis) represents the relative ratio of the operation complexity to one addition of the table-based DCT/IDCT. The table-based DCT/IDCT exhibits the linear operation complexity since the number of input values included in the DCT/IDCT process increases by the number of input values other than 0, and the row-column decomposition method has the small operation load as a whole but exhibits the constant operation complexity regardless of the input values.

Therefore, the reference value 430 as a threshold is set using the number of input values other than 0, the table-based DCT/IDCT is used in the range in which the number of input values other than 0 is equal to or less than the reference value 430, and the row-column decomposition method is used when the number of input values other than 0 is more than the reference value 430. Accordingly, the maximum gain in the operation complexity is expected using the combination of various methods.

The reference value may be designated as an arbitrary value determined to be the best by statistically comparing the processing efficiencies of the DCT/IDCTs.

Although it is shown in FIG. 3 that any one of the row-column decomposition-based operation unit 320 and the table-based operation unit 200 selectively the DCT/IDCT operation, the row-column decomposition-based operation unit 320 may be replaced with another DCT/IDCT operation method according to the background art or another DCT/IDCT operation method may be added.

The function and configuration of the row-column decomposition-based operation unit 320 performing an operation based on the row-column decomposition method according to the background art are obvious to those skilled in the art and thus will not be described herein. The function and configuration of the table-based operation unit 200 are described above with reference to FIG. 2 and thus will not be repeatedly described.

Figure 5:
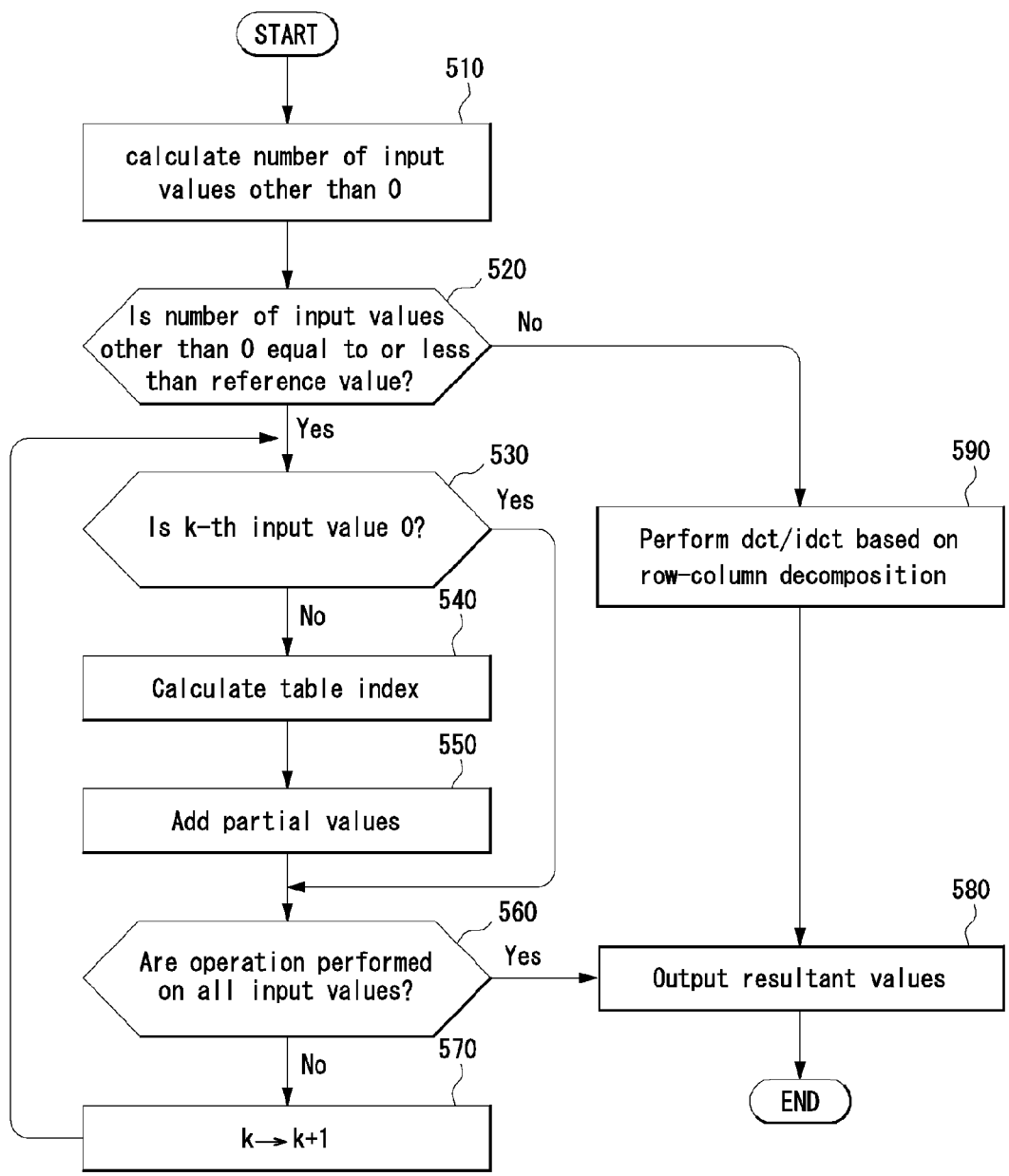
FIG. 5 is a flowchart illustrating the flow of a DCT/IDCT operation in a hybrid table-based operation unit according to the embodiment of the invention.

FIG. 5 is a flowchart illustrating the flow of a DCT/IDCT operation in the hybrid table-based operation unit according to the embodiment of the invention. FIG. 6 is a diagram illustrating a lookup table for the IDCT operation according to the embodiment of the invention.

As described above with reference to FIG. 3, the hybrid table-based operation unit 300 can together use the table-based DCT/IDCT and the row-column decomposition method so as to more efficiently lower the operation complexity.

As shown in FIG. 4, the table-based DCT/IDCT can obtain a great gain in the operation complexity by excluding the input values of 0 from the DCT/IDCT process when the number of input values of 0 is great. However, when the number of input values of 0 is small, it may be difficult to obtain a great gain in the operation complexity, compared with the DCT/IDCT according to the background art. Accordingly, the hybrid table-based operation unit 300 together or selectively uses the row-column decomposition method exhibiting the constant operation complexity regardless of the number of input values of 0 and the table-based DCT/IDCT exhibiting excellent performance when the number of input values of 0 is great.

The DCT/IDCT based on the processing concept of the hybrid table-based operation unit 300 can be expressed by Expression 7. Expression 7 is an expression of the IDCT and Expression 8 is an expression of the DCT.

$$f(x, y) = \begin{cases} \sum_{a_i \in A_{xy}} T(a_i), & n(A_{xy}) \leq \text{Threshold} \\ B_b(x, y), & \text{Otherwise} \end{cases} \quad \text{Expression 7}$$

Here, the set $A_{xy}$ is expressed by $A_{xy}=\{\text{Index}(x,y,F(u,v)|F(u,v)\neq 0, 0 \leq u \leq N-1, 0 \leq v \leq N-1\}$. The set $B_b(x,y)$ means the IDCT operation based on the row-column decomposition method. The IDCT operation method based on the row-column decomposition method may be a Chen's algorithm.

$$F(u, v) = \begin{cases} \sum_{b_i \in B_{uv}} T(b_i), & n(B_{uv}) \le \text{Threshold} \\ B_f(u, v), & \text{Otherwise} \end{cases} \quad \text{Expression 8}$$

Here, the set $B_{uv}$ is expressed by $B_{uv}=\{\text{Index}(u,v,f(x,y)|f(x,y) \ne 0,\ 0 \le x \le N-1,\ 0 \le y \le N-1\}$. The set $B_f(u,v)$ means the DCT operation based on the row-column decomposition method. The DCT operation based on the row-column decomposition method may be a Chen's algorithm.

Referring to FIG. 5, the method selecting unit 310 calculates the number of input values other than 0 (zero) (or the number of input values of 0 (zero)) to select the method used to perform the DCT/IDCT in step 510, and determines whether the number of input values other than 0 is equal to or less than the reference value in step 520. Here, the number of input values other than 0 may be calculated using the number of input values of 0 and may be compared with the reference value. That is, any method used to perform the DCT/IDCT can be selected by calculating the number of input coefficient values other than 0 and checking whether the calculated number of input coefficient values other than 0 is equal to or less than a predetermined reference value.

When the number of input values of 0 is equal to or more than the reference value (or when the number of input values other than 0 is equal to or less than the reference value), the determination unit 220 determines whether the k-th input value (for example, the pixel value of a specific coordinate in the input N×N block) is 0 in step 530.

When the k-th input value (where k is a natural number) is 0, the process of step 560 is performed to exclude the input value from the operation. However, when the k-th input value is not 0, the index calculating unit 230 calculates the table index so as to extract the partial value corresponding to the input value from the table information storage unit 240 in step 540. Here, as described above, when the output value of which the coordinate in the output N×N block is (0, 0) is F(0, 0) and a previously-calculated weight value is 1, it is not necessary generate any particularly table index. Accordingly, the input value selecting unit 210 may directly output the input values (that is, the pixel values in the N×N block in the pixel domain) themselves to the adder unit 240.

In step 550, the adder unit 240 extracts the partial value corresponding to the table index calculated by the index calculating unit 230 from the table information storage unit 240 and then adds the extracted value to the previously-added value. When it is determined in step 530 that the input value is a first input value, there is no previously-added value, and thus the added value is 0.

In step 560, the determination unit 220 determines whether the DCT/IDCT operation is performed on all the input values so as to output the resultant value of a specific coordinate in the N×N block to be output.

When the DCT/IDCT operation is not performed on all the input values, the processes of steps 530 to 560 are repeated to add the partial value corresponding to the input value of which the k value increases by 1, that is, the (k+1)-th input value.

However, when the DCT/IDCT operation is performed on all the input values, the resultant value is output in step 580.

Here, when the table-based operation is performed, the resultant value is the addition of the partial values extracted for all the input values other than 0.

The addition of the partial values may be sequentially performed on all the input values or may be performed at a time after all the partial values corresponding to the input values are extracted.

The processes of steps 530 to 580 are repeated until the result values of all the coordinates in the N×N block to be output are output. When the adder unit 240 is embodied with a structure reading 64 partial values corresponding to the indexes from the tables and then calculating the resultant values corresponding to the coordinates in the N×N to be output, the processes of steps 530 to 580 can be repeated by N times at most.

The partial value adding process will be described with reference to the lookup table shown in FIG. 6.

The lookup table shown in FIG. 6 includes the values in the range of all the generable input values (for example, from −2048 to 2047) as indexes and includes the partial values corresponding to the indexes calculated by the expressions of FIG. 6.

Only the F(0, 1) table is shown in FIG. 6. However, in case of N=8, the lookup table can be constructed as a two-dimensional table including F(0, 0) to F(7, 7), the index values of the tables are the same as the input values, and 64 partial values (when N is 8) are stored for each index. The respective partial values mean a factor for calculating the corresponding pixel value. Here, F(0, 0) may be constructed as a table, but the weight values are the same as can be seen from Expression 3 and FIG. 6 and thus F(0, 0) may not be constructed as a table.

For example, when it is assumed that −47 is input as an input value to F(0, 1), the partial values corresponding to the index −47 are searched for from the index values of the F(0, 1) table and a necessary partial value is extracted from 64 partial values corresponding to f(0, 0) to f(7, 7). Thereafter, when 111 is input as an input value to F(0, 2), a necessary partial value is extracted from 64 partial values corresponding to the index 111 in the table. When an input value 0 is input to F(0, 3), the process is performed on a next coefficient without any access to the table information storage unit 250. The same processes are repeated up to F(7, 7) and the corresponding partial values are all added to complete the pixel value from f(0, 0) to f(7, 7) undergoing the IDCT. Here, when the adder unit 240 is embodied in a structure reading all the 64 partial values corresponding to the corresponding index from the tables and then independently calculating the necessary values to complete the pixel values from f(0, 0) to f(7, 7), the resultant values corresponding to the respective coordinates in the N×N block can be calculated and output through 64 memory accesses and additions in maximum.

Referring to step 520 of FIG. 5 again, when the number of input values other than 0 is more than the reference value, the DCT/IDCT operation based on the row-column decomposition method is performed in step 590 and the resultant values of the operation is output in step 580.

As described above, the hybrid table-based operation unit 300 has a merit of cooperating with all the DCT/IDCT operations using the row-column decomposition method and a merit of efficiently adding the table-based DCT/IDCT operation to greatly reduce the operation complexity in the course of the DCT/IDCT operation.

A time complexity experiment in which the Chen's algorithm most generally used in the row-column decomposition method and the table-based IDCT and the hybrid table-based IDCT described in the embodiments of the invention are applied to a decoder and the results are compared will be described below.

In general, the operation complexity is much used to evaluate the IDCT performance, but the operation complexity varies depending on sequences and quantization parameters (QP) in view of algorithm characteristics. Accordingly, the algorithm performance will be evaluated using the time complexity. This can be similarly to the DCT module.

In the MPEG-4 simple profile, the IDCT designs for the time complexity experiment are as follows.

Since the Chen's algorithm is used as the IDCT technique in the decoder of the MPEG-4 simple profile, the IDCT module used in MPEG-4 SP reference S/W is used in this experiment.

The lookup table stored in the table information storage unit 250 for the table-based IDCT operation of the MPEG-4 simple profile has the structure shown in FIG. 6.

The information on the number of coefficients other than 0 in an 8×8 block is necessary for constructing the hybrid table-based IDCT of the MPEG-4 simple profile. For the purpose of this information, the number of level values was counted in the entropy coding process prior to the IDCT process to acquire the information on the number of coefficients other than 0. A threshold value is necessary for comparison with the number of coefficients other than 0. When the threshold value is 12 in the CIF sequence of the S/W embodied for the experiment, the best performance was exhibited. Accordingly, the threshold value was set to 12. The reference value varies depending on how to embody the table-based IDCT.

As described above, the MPEG-4 simple profile decoder was constructed so as to use the table-based IDCT when the number of coefficients other than 0 is less than 12 in the CIF sequence and to use the row-column decomposition-based IDCT using the Chen's algorithm according to the background art otherwise.

The results of the time complexity experiment depending on the IDCT designs are as follows. For reference, the experiment was carried out on a CIF video and an HD sequence video and the experiment conditions of the CIF video are shown in Table 1.

TABLE 1

| Sequence | akiyo(352x288, 300frame), foreman(352x288, 300frame), mobile(352x288, 300frame), Stefan(352X240, 240frame) |
|---|---|
| Quantize step size | 5, 16, 25 |

The resultant values corresponding to the experiment conditions in Table 1 are shown in Table 2. In Table 2, "Time" represents the IDCT time in the units of micro seconds and percentage ("%") represents the ratio of the IDCTs of the algorithm when it is assumed that the IDCT time of the Chen's algorithm is 100% in the MPEG-4 simple profile.

TABLE 2

| Se-quence | QP | Chen Time | % | Table Time | % | Hybrid Time | % |
|---|---|---|---|---|---|---|---|
| akiyo | 5 | 686,164 | 100 | 478,209 | 69.69 | 493,152 | 71.87 |
|  | 16 | 308,972 | 100 | 183,923 | 59.53 | 154,380 | 49.97 |
|  | 25 | 262,714 | 100 | 141,894 | 54.01 | 125,332 | 47.71 |

TABLE 2-continued

| Se-quence | QP | Chen Time | % | Table Time | % | Hybrid Time | % |
|---|---|---|---|---|---|---|---|
| foreman | 5 | 2,586,065 | 100 | 1,743,253 | 67.41 | 1,643,060 | 63.54 |
|  | 16 | 712,283 | 100 | 432,525 | 60.72 | 379,789 | 53.32 |
|  | 25 | 466,034 | 100 | 261,578 | 56.13 | 222,078 | 47.65 |
| mobile | 5 | 4,630,852 | 100 | 5,154,334 | 111.30 | 3,496,873 | 75.51 |
|  | 16 | 2,371,253 | 100 | 1,637,950 | 69.08 | 1,403,492 | 59.19 |
|  | 25 | 1,417,233 | 100 | 889,220 | 62.74 | 809,325 | 57.11 |
| stefan | 5 | 1,583,004 | 100 | 1,914,873 | 120.96 | 1,284,541 | 81.15 |
|  | 16 | 1,592,349 | 100 | 1,086,364 | 68.22 | 976,375 | 61.32 |
|  | 25 | 1,496,259 | 100 | 995,427 | 66.53 | 824,418 | 55.10 |

Referring to the experiment results on the CIF video shown in Table 2, the table-based IDCT exhibited about 70% (a decrease in time complexity by about 30%) in all the sequences and QPs and about 54% in maximum which decreases by 46%, compared with the IDCT time of the Chen's algorithm. On the other hand, the hybrid table-based IDCT exhibited about 60% (a decrease in time complexity by about 40%) in all the sequences and QPs and about 47% in maximum which decreases by 53%, compared with the IDCT time of the Chen's algorithm.

Accordingly, it can be seen that the table-based IDCT and the hybrid table-based IDCT according to the embodiment of the invention have more excellent performance than the Chen's algorithm-based IDCT according to the background art.

The table-based IDCT and the hybrid table-based IDCT according to the embodiment of the invention were compared with the Chen's algorithm-based IDCT according to the background in image quality degradation through a particular experiment. This is because many fast IDCT algorithms have the problem with image quality degradation.

An RD graph representing the image quality with respect to a compression ratio was used for the comparison. In the RD graph, the horizontal axis represents the bit rate (bps) and the vertical axis represents the PSNR (dB). It was seen from the experiment result that the table-based IDCT and the hybrid table-based IDCT according to the embodiment of the invention and the Chen's algorithm-based IDCT exhibit the same PSNR value.

Figure 7:
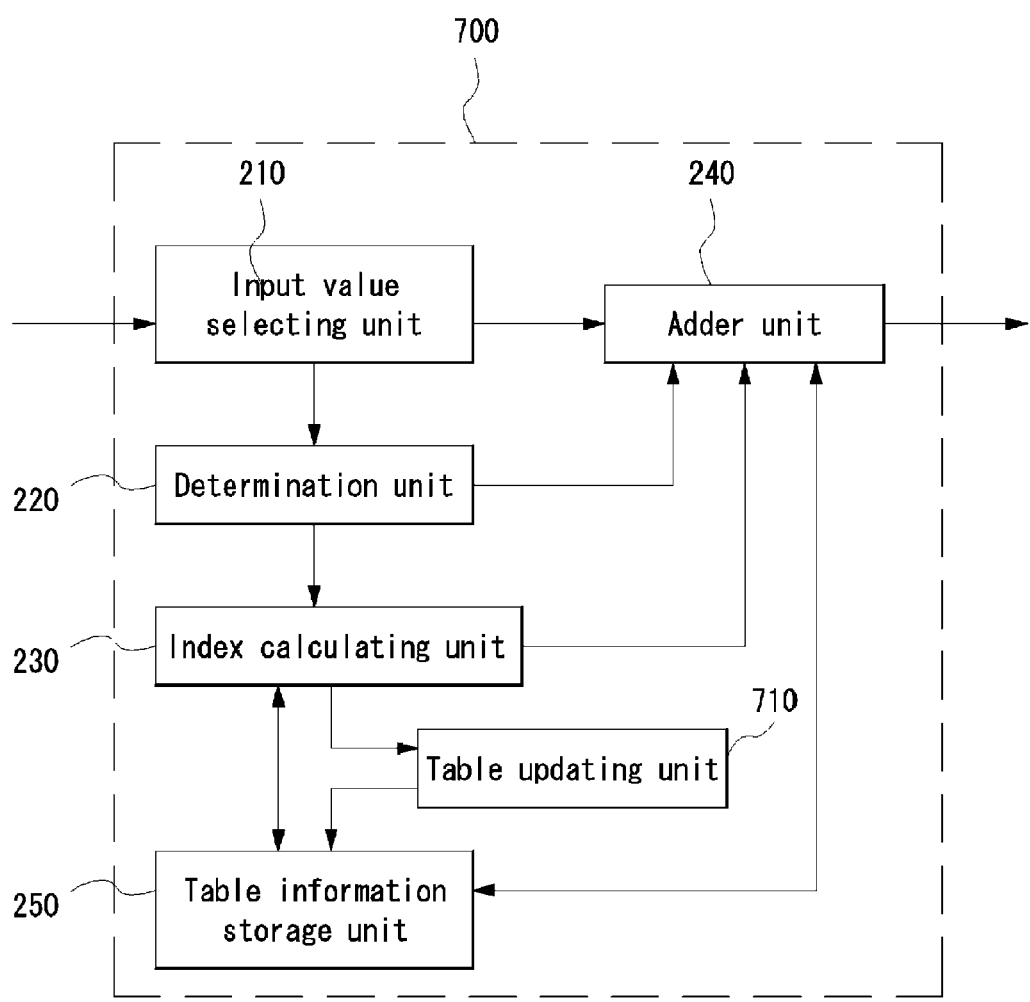
FIG. 7 is a diagram illustrating the configuration of a DCT/IDCT operation unit according to still another embodiment of the invention.

FIG. 7 is a diagram illustrating the configuration of a DCT/IDCT operation unit according to still another embodiment of the invention.

Referring to FIG. 7, the DCT/IDCT operation unit 200 includes an input value selecting unit 210, a determination unit 220, an index calculating unit 230, an adder unit 240, a table information storage unit 250, and a table updating unit 710. That is, the DCT/IDCT operation unit further includes the table updating unit 710, compared with the DCT/IDCT operation unit 200 shown in FIG. 2.

It has been described above with reference to FIG. 2 that the table stored in the table information storage unit 250 of the DCT/IDCT operation unit 200 can store the partial values corresponding to all the input values in the course of the DCT/IDCT operation.

However, the table may be updated in real time so that the partial values are calculated and stored in the table at a necessary time without initially storing the partial values corresponding to all the input values. In this case, the initial table may be generated without storing any value and may be updated in real time, or may be generated to store only input values having a high use frequency. Here, the input values having a high use frequency can be statistically determined.

The updating and use of the table will be described below with reference to FIG. 7. The same details as described above with reference to FIG. 2 will not be described again.

First, when the determination unit 220 determines that it is included in the process of DCT/IDCT operation, the index calculating unit 230 calculates a table index. Thereafter, the index calculating unit supplies the calculated table index to the adder unit 240 so as to add the partial values.

At this time, the index calculating unit 230 determines whether the partial value corresponding to the table index is stored in the table information storage unit 250 before supplying the table index to the adder unit 240, and instructs the table updating unit 710 to update the table when determining that the partial value is not stored. For example, when the indexes −47 and −45 are stored in the table and −46 is input as the input value, the table updating unit 710 can be instructed to update the table so as to enable the DCT/IDCT thereof The adder unit 240 may determine whether the corresponding partial value is stored in the table information storage unit 250 and the adder unit 240 may instruct the table updating unit to update the table when the corresponding partial value is not stored.

The table updating unit 710 calculates the partial value corresponding to the input value (that is, index) and updates the table so as to store the calculated partial value in the corresponding table in accordance with the instruction from the index calculating unit 230 or the adder unit 240. The updated table is stored in the table information storage unit 250 and is read and used in the subsequent DCT/IDCT process.

The above-mentioned discrete cosine transform/inverse discrete cosine transform method may be carried out as an automated sequence in time series by a software program built in the DCT/IDCT operation unit. Codes and code segments of the program will be easily obtained by programmers skilled in the art. The program can be stored in a computer-readable recording medium and can be read and executed by a computer to embody the above-mentioned methods. The recording medium includes a magnetic recording medium, an optical recording medium, and a carrier wave medium.

While the invention is described with reference to the embodiments, it will be understood by those skilled in the art that the invention can be modified and changed in various forms without departing from the concept and scope of the invention described in the appended claims.

The invention claimed is:

1. A discrete cosine transform (DCT)/inverse discrete cosine transform (IDCT) device performing one or more of a DCT operation and an IDCT operation, the DCT/IDCT device comprising:
a row-column decomposition-based operation unit that performs a DCT/IDCT operation based on row-column decomposition;
a table-based operation unit that performs a table-based DCT/IDCT operation; and
a method selecting unit that recognizes the number of input values other than 0 (zero) out of the input values of coordinates in an input block, compares the recognized number of input values with a predetermined reference value, and instructs the row-column decomposition-based operation unit or the table-based operation unit to perform an operation,
wherein the table-based operation unit includes:
a table information storage unit that stores a plurality of table information pieces including partial values corresponding to a multiplication of a weight value and an index;
an index calculating unit that generates a table index of only an input value other than 0 out of the input values of the coordinates in the input block; and
an adder unit that adds one or more partial values included in the plurality of table information pieces and corresponding to the table index and calculates resultant values of coordinates in an output block, and
wherein the method selecting unit recognizes the number of input values other than 0 with reference to the number of level values in the course of entropy coding.

2. The DCT/IDCT device according to claim 1, wherein the table-based operation unit further includes a table updating unit that calculates the partial values to update one or more table information pieces, and
wherein the table updating unit updates the table information pieces so as to include an index corresponding to a request from the index calculating unit or the adder unit when a corresponding partial value is not stored in the table information piece designated by the generated table index.

3. The DCT/IDCT device according to claim 1, wherein the method selecting unit instructs the table-based operation unit to perform the operation only when the number of input values other than 0 is equal to or less than the reference value.

4. The DCT/IDCT device according to claim 1, wherein the method selecting unit for an MPEG-4 part10 AVC/H.264 codec recognizes the number of input values other than 0 using information on the number of input values other than 0 which is calculated and stored as a parameter in advance.

5. The DCT/IDCT device according to claim 1, wherein the weight value is a value determined on the basis of the coordinate value in the output block and the coordinate value in the input block, and the index is designated as a one or more integer values included in the range of the input values.

6. The DCT/IDCT device according to claim 1, further comprising a determination unit that determines that the DCT/IDCT operation should not be performed on the input value of 0 (zero) and outputs the coordinate value corresponding to the input value 0 (zero) to the adder unit.

7. A discrete cosine transform (DCT)/inverse discrete cosine transform (IDCT) method causing an operation device to perform one or more of a DCT operation and an IDCT operation, the DCT/IDCT method comprising:
recognizing the number of input values other than 0 (zero) out of input values of coordinates in an input block and comparing the recognized number of input values with a predetermined reference value; and
performing a table-based transform method out of a row-column decomposition-based method and the table-based transform method only when the number of input values other than 0 is equal to or less than the reference value, wherein the table-based transform method includes:
generating a table index for only an input value other than 0 out of the input values of the coordinates in the input block;
reading one or more partial values corresponding to the table index out of a plurality of table information pieces which are generated and stored in advance so as to include partial values corresponding to a multiplication of a weight value and an index; and
adding the read partial values and calculating a resultant value of each coordinate in an output block, and
wherein the number of input values other than 0 is recognized with reference to the number of level values in the course of entropy coding.

8. The DCT/IDCT method according to claim 7, wherein the reading of the partial values includes:
  determining whether the partial values corresponding to the table index are stored in the table information pieces;
  calculating the partial values through the multiplication corresponding to the table index and updating the table information pieces when it is determined that the partial values are not stored in the table information pieces; and
  reading the partial values corresponding to the table index from the updated table information pieces.

9. The DCT/IDCT method according to claim 7, wherein the number of input values other than 0 for an MPEG-4 part10 AVC/H.264 codec is recognized using information on the number of input values other than 0 which is calculated and stored as a parameter in advance.

10. The DCT/IDCT method according to claim 7, wherein the weight value is a value determined on the basis of the coordinate value in the output block and the coordinate value in the input block, and the index is designated as a one or more integer values included in the range of the input values.

11. A discrete cosine transform (DCT)/inverse discrete cosine transform (IDCT) device performing one or more of a DCT operation and an IDCT operation, the DCT/IDCT device comprising:
  a row-column decomposition-based operation unit that performs a DCT/IDCT operation based on row-column decomposition;
  a table-based operation unit that performs a table-based DCT/IDCT operation; and
  a method selecting unit that recognizes the number of input values other than 0 (zero) out of the input values of coordinates in an input block, compares the recognized number of input values with a predetermined reference value, and instructs the row-column decomposition-based operation unit or the table-based operation unit to perform an operation,
  wherein the table-based operation unit includes:
  a table information storage unit that stores a plurality of table information pieces including partial values corresponding to a multiplication of a weight value and an index;
  an index calculating unit that generates a table index of only an input value other than 0 out of the input values of the coordinates in the input block; and
  an adder unit that adds one or more partial values included in the plurality of table information pieces and corresponding to the table index and calculates resultant values of coordinates in an output block, and
  wherein the method selecting unit for an MPEG-4 part10 AVC/H.264 codec recognizes the number of input values other than 0 using information on the number of input values other than 0 which is calculated and stored as a parameter in advance.

12. A discrete cosine transform (DCT)/inverse discrete cosine transform (IDCT) method causing an operation device to perform one or more of a DCT operation and an IDCT operation, the DCT/IDCT method comprising:
  recognizing the number of input values other than 0 (zero) out of input values of coordinates in an input block and comparing the recognized number of input values with a predetermined reference value; and
  performing a table-based transform method out of a row-column decomposition-based method and the table-based transform method only when the number of input values other than 0 is equal to or less than the reference value,
  wherein the table-based transform method includes:
  generating a table index for only an input value other than 0 out of the input values of the coordinates in the input block;
  reading one or more partial values corresponding to the table index out of a plurality of table information pieces which are generated and stored in advance so as to include partial values corresponding to a multiplication of a weight value and an index; and
  adding the read partial value values and calculating a resultant value of each coordinate in an output block, and
  wherein the number of input values other than 0 for an MPEG-4 part10 AVC/H. 264 codec is recognized using information on the number of input values other than 0 which is calculated and stored as a parameter in advance.

* * * * *